(12) United States Patent
Huguenet

(10) Patent No.: US 6,196,864 B1
(45) Date of Patent: Mar. 6, 2001

(54) SHELL FOR AN ELECTRICAL OR AN OPTICAL CONNECTOR

(75) Inventor: Jean-Pierre Huguenet, Biarne (FR)

(73) Assignee: Amphenol Socapex (FR)

( * ) Notice: Subject to any disclaimer, the term of this patent is extended or adjusted under 35 U.S.C. 154(b) by 0 days.

(21) Appl. No.: 09/598,322

(22) Filed: Jun. 21, 2000

Related U.S. Application Data

(63) Continuation of application No. 09/127,789, filed on Aug. 3, 1999.

(30) Foreign Application Priority Data

Aug. 8, 1997 (FR) .................................................. 97 10202

(51) Int. Cl.⁷ .................................................. H01R 13/56
(52) U.S. Cl. .......................................................... 439/446
(58) Field of Search .................................. 439/446, 6, 8, 439/13, 31, 610

(56) References Cited

U.S. PATENT DOCUMENTS

| | | | |
|---|---|---|---|
| 1,778,549 | * 10/1930 | Conner | 439/446 |
| 5,735,707 | * 4/1998 | O'Groske et al. | 439/446 |
| 5,746,625 | * 5/1998 | Aparicio et al. | 439/610 |

* cited by examiner

Primary Examiner—Gary Paumen
Assistant Examiner—Alexander Gilman
(74) Attorney, Agent, or Firm—Blank Rome Comisky & McCauley, LLP

(57) ABSTRACT

The invention relates to a shell for an electrical or an optical connector comprising two half-shells that can be secured to each other and that define an internal chamber, a first end through which an electrical or an optical cable can pass, and a second end for fixing to the electrical or optical connector. Close to its first end, the inside face of the half-shell has a portion in the form of a concave spherical cap, the two spherical caps, when the half-shells are assembled together, substantially facing each other and being disposed on substantially the same sphere, and the shell further comprises a moving member having an axial passage for the cable, said moving member having a first portion in the form of a portion of a sphere and a second portion of elongate shape, and when the two half-shells are assembled together, said portion of spherical shape co-operates with the spherical caps while the portion of elongate shape is disposed inside said chamber.

7 Claims, 1 Drawing Sheet

SHELL FOR AN ELECTRICAL OR AN OPTICAL CONNECTOR

This application is a continuation of Ser. No. 09/127,789 filed Aug. 3, 1999.

The present invention relates to a shell for an electrical or an optical connector.

BACKGROUND OF THE INVENTION

The term "shell for an electrical or an optical connector" is used to designate a box which is fixed to the rear portion of the connector proper and whose function is firstly to surround and protect the ends of the electrical or optical conductors of the cable in the zones thereof that are connected to the terminals of the connector, and secondly to determine the direction of the electrical or optical cable terminating at the connector, and thus at the shell.

Usually, the shell has a passage for the cable which is axial. In some cases, the shell is shaped so that the cable outlet is disposed at right-angles relative to the longitudinal axis of the shell and of the electrical or optical connector.

In other words, whatever the type of connector shell under consideration, the direction of the cable connected to the connector is determined. It is either axial or orthogonal.

Unfortunately, there exist numerous situations in which it is necessary to give the electrical or optical cable a special direction where it leaves the connector as a function of surrounding conditions and as a function of the availability of room where the connector is installed. In particular, it is very important for the cable to extend in the appropriate direction so as to avoid imparting stresses due to excessive curvature of the cable.

OBJECTS AND SUMMARY OF THE INVENTION

An object of the present invention is to provide a shell for an electrical or an optical connector that makes it possible, when connecting the cable to the connector, to give an appropriate direction to the cable outlet.

To achieve this object, according to the invention, a shell for an electrical or an optical connector comprises two half-shells that can be secured to each other and that define an internal chamber, a first end through which an electrical or an optical cable can pass, and a second end for fixing to the electrical or optical connector, and, close to its first end, the inside face of the half-shell has a portion in the form of a concave spherical cap, the two spherical caps, when the half-shells are assembled together, substantially facing each other and being disposed on substantially the same sphere, and the shell further comprises a moving member having an axial passage for the cable, said moving member having a first portion in the form of a portion of a sphere and a second portion of elongate shape, and when the two half-shells are assembled together, said portion of spherical shape co-operates with the spherical caps while the portion of elongate shape is disposed inside said chamber.

It will be understood that the spherical portion of the moving member through which the cable passes co-operates with the two surfaces in the form of portions of spherical caps formed in the two half-shells of the shell to constitute a ball-and-socket system making it possible to give the desired direction to the cable where it leaves the shell.

The portion of elongate shape which may be of right section which is circular, with flats, or hexagonal, can serve for taking up the shielding of the electric cable or for fixing the cable.

In a preferred embodiment, when the two half-shells are assembled together, contact between the spherical portion of the moving member and the surfaces provide tight contact so that the moving member conserves a determined direction.

It will be understood that after the various electrical or optical conductors of the cable have been connected to the connector, the moving member can be given a desired direction and that this direction will be maintained by friction after the two half-shells constituting the shell have been assembled together.

BRIEF DESCRIPTION OF THE DRAWING

Other characteristics and advantages of the invention appear more clearly on reading the following description of various embodiments of the invention given as non-limiting examples. The description refers to the accompanying figures, in which.

MORE DETAILED DESCRIPTION

Figure 1:
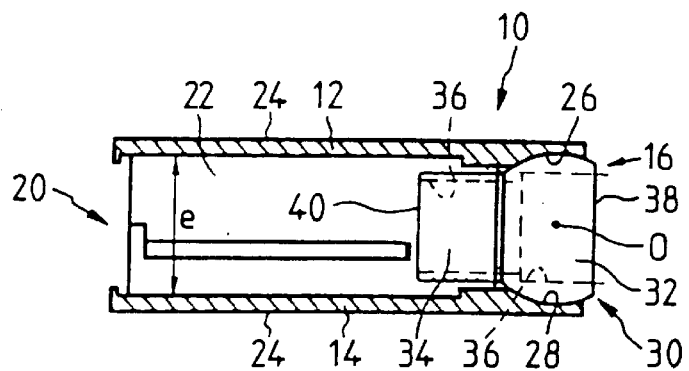
FIG. 1 is a simplified vertical section view showing the principles on which the shell is based.
Figure 2:
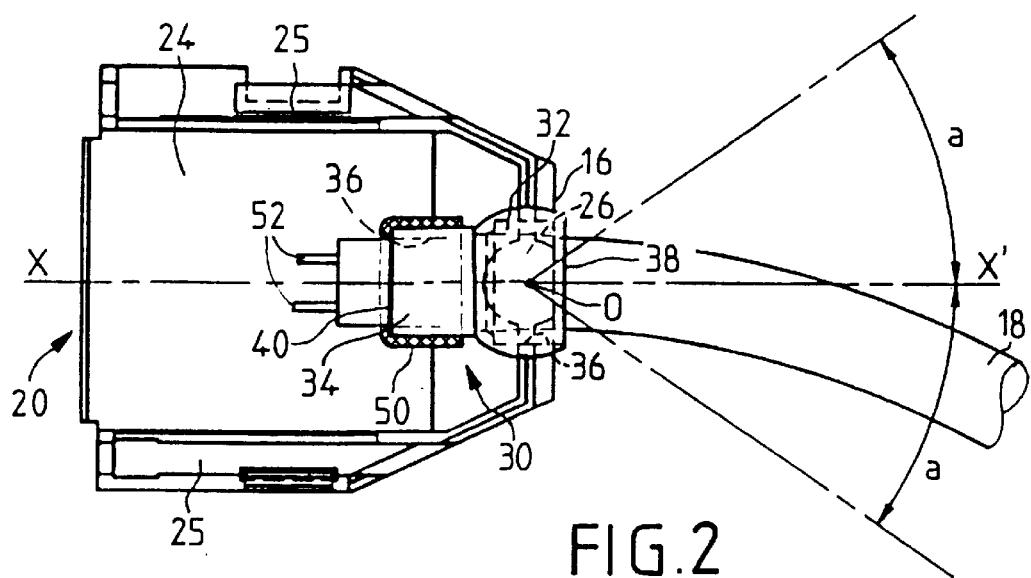
FIG. 2 is a theoretical plan view showing how the moving member can be put into position in the bottom half-shell.

With reference initially to FIGS. 1 and 2, the principles of the shell of the invention for an electrical or optical connector are described.

The description of the invention begins with the particular case of an electrical connector.

The shell 10 is constituted by two half-shells 12 and 14 designed to be assembled to each other after the connections have been made between the conductors of the cable and the electrical connector. The half-shells 12 and 14 have a first end 16 through which the electric cable 18 passes and a second end 20 in which the electrical connector proper is fixed. When the two half-shells 12 and 14 are assembled together, they define a chamber 22 in which the cable conductors connected to the terminals of the electrical connector are enclosed. Each half-shell has a main wall 24 that is substantially plane, and a rim 25, the rims 25 being designed to be assembled together. Close to the cable outlet end 16, the main wall of each half-shell is made to have a surface portion in the form of a spherical cap, said surface portions being given respective references 26 and 28. When the two half-shells 12 and 14 are assembled together, the concave spherical caps 26 and 28 face each other and are disposed on substantially the same spherical surface centered on O.

The shell also includes a moving member 30 through which the cable 18 passes and which serves to determine the direction in which the cable leaves the shell 10. The moving member 30 is constituted by a part in the form of a portion of a sphere 32 associated with an elongate portion 34. An axial orifice 36 of diameter slightly greater than the diameter of the electric cable 18 passes through the entire moving member 30, said passage 36 opening out to the two ends 38 and 40 of the moving member 30. As can be seen in the figures, the moving member 30 is mounted between the two half-shells in such a manner that its cylindrical portion 34 is inside the chamber 22 defined by the two half-shells. The elongate portion 34 may be of circular right section with flats, or of hexagonal right section.

The half-shells 12 and 14 and the moving member 30 are all made of a conductive material, for example the material sold under the trademark Zamak. When the two half-shells are assembled together, contact between the spherical portion 32 of the moving member and the spherical caps 26 and 28 is tightened so that the moving member retains the direction that has been given to it relative to the longitudinal axis XX' of the shell, while remaining in the join plane between the half-shells.

As shown more clearly in FIG. 2, the elongate portion 34 of the moving member 30 serves to take up the shielding of the cable 18. In this figure, the shielding 50 is shown fixed to the outside face of the elongate portion 34. The figure also shows the various electrical conductors 52 making up the cable and having their stripped ends connected to the various terminals of the electrical connector.

The outside diameter of the cylindrical portion 34 is preferably slightly smaller than the distance e between the main walls of the two half-shells when they are assembled together. Thus, the cylindrical portion 34 is held substantially in a single plane. The difference in thickness makes it possible to fix the shielding onto the outside face of the cylindrical portion 34.

As shown clearly in FIG. 2, the axis of the moving member 30 can be given an angle a relative to the axis XX' of the shell. This angle a lies in the range about −35° to +35°.

It can also be seen that the length of the moving member 30 is relatively short compared with the length of the two half-shells. This conserves a large volume for setting up the wiring chamber 22.

Figure 3:
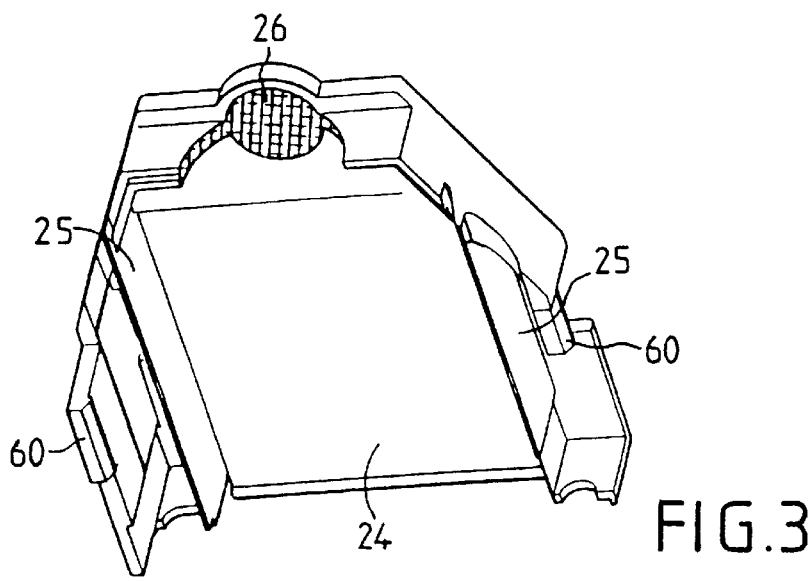
FIG. 3 is a perspective, view of a preferred embodiment of a half-shell of the shell.

FIG. 3 shows a preferred embodiment of a half-shell in greater detail. In particular, this figure shows a snap-fastening system 60 formed on the edge of each half-shell and enabling the two half-shells of the shell to be assembled together.

In the description above, it has been assumed that the cable fitted to the shell has shielding. When the cable does not have shielding, the two half-shells and the moving member may be made of a plastics material that is insulating. The elongate portion of the moving member then serves only to install a clamping ring for securing the cable to the moving member.

As mentioned above, the invention also applies to a shell for an optical connector. Under such circumstances, the optical cable passes through the axial passage of the moving member and is fixed thereto by any appropriate means. At its end, the optical cable is connected as a whole to the optical connector or each optical conductor is connected individually to a corresponding coupling element of the optical connector.

What is claimed is:

1. A shell for an electrical or optical connector for connecting an electrical or optical cable, said shell comprising:

first and second half-shells means for securing together said two half-shells, said two half-shells defining an internal chamber, each half-shell having an internal face, a first end provided with an opening for the passage of an optical or electrical cable and a second end provided with connecting means for fixing said shell to said electrical or optical connector, said internal face thereof forming a concave spherical cap, said concave spherical caps of the two half-shells facing one another and being disposed on substantially the same spherical surfaces; and a moving member having an axial passage comprising a first portion having the form of a portion of a sphere disposed between two concave spherical caps for cooperating therewith, and an elongate portion entirely disposed within said internal chamber behind the first portion of the moving member.

2. A shell according to claim 1, wherein the two half-shells and the moving member are made of an electrically conductive material, and the cable is a shielded electric cable.

3. A shell according to claim 1, wherein, when the two half-shells are assembled together, contact between the portion of the moving member in the form of a portion of a sphere and the spherical caps is tightened.

4. A shell according to claim 1, wherein each half-shell comprises a main wall in which said spherical cap is formed, and edges provided with assembly means for assembling said half-shells together, the distance between said main walls when the two half-shells are assembled together being slightly greater than the dimensions of the elongate portion of the moving member so as to allow the shielding of the cable to be fixed on the outside face of said elongate portion.

5. A shell according to claim 1, wherein said cable is an optical cable.

6. A shell for an electrical or optical connector for connecting an electrical or optical cable provided with a shield, said shell comprising:

first and second half-shells and means for securing together said two half-shells, said two half-shells defining an internal chamber, each half-shelf having an internal face, a first end provided with an opening for the passage of an optical or electrical cable and a second end provided with connecting means for fixing said shell to said electrical or optical connector, said internal face thereof forming a concave spherical cap, said concave spherical caps of the two half-shells facing one another and being disposed on substantially the same spherical surfaces; and a moving member having an axial passage comprising a first portion having the form of a portion of a sphere disposed between said two concave spherical caps for cooperating therewith, and an elongate portion entirely disposed within said internal chamber behind the first portion of the moving member, said moving member being made of a conductive material and said elongate portion of the moving member having an outer surface substantially cylindrical in shape for receiving the shield of said cable.

7. A shell according to claim 6, wherein the distance between the internal faces of the half-shells when the half-shells are assembled together is slightly greater then the dimensions of the elongate portion of the moving member so as to allow the shielding of the cable to be fixed on the outside surface of said elongate portion.

* * * * *

UNITED STATES PATENT AND TRADEMARK OFFICE
CERTIFICATE OF CORRECTION

PATENT NO. : 6,196,864 B1
DATED : March 6, 2001
INVENTOR(S) : Jean-Pierre Huguenet It is certified that error appears in the above-identified patent and that said Letters Patent is hereby corrected as shown below:

Title page,
Related Application Data, "Aug. 3, 1999" should read -- Aug. 3, 1998 --.

Column 1,
Line 27, "ncessary" should read -- necessary --.

Column 2,
Line 23, delete "," after "perspective".

Signed and Sealed this

Twenty-second Day of January, 2002

Attest:

JAMES E. ROGAN
*Attesting Officer*  *Director of the United States Patent and Trademark Office*